(12) United States Patent
Oishi et al.

(10) Patent No.: US 6,481,657 B1
(45) Date of Patent: Nov. 19, 2002

(54) FISHING REEL

(75) Inventors: Harumichi Oishi, Tokyo (JP); Syuichi Matsuzawa, Saitama (JP)

(73) Assignee: Daiwa Seiko Inc., Tokyo (JP)

( * ) Notice: Subject to any disclaimer, the term of this patent is extended or adjusted under 35 U.S.C. 154(b) by 14 days.

(21) Appl. No.: 09/696,307

(22) Filed: Oct. 26, 2000

(30) Foreign Application Priority Data

Oct. 28, 1999 (JP) .......................................... 11-306269

(51) Int. Cl.$^7$ ................................................ A01K 89/01
(52) U.S. Cl. ...................................... 242/289; 242/303
(58) Field of Search ................................ 242/288, 289, 242/303; 188/181 A, 185

(56) References Cited

U.S. PATENT DOCUMENTS

| | | | | |
|---|---|---|---|---|
| 1,566,594 A | * | 12/1925 | Graham | 242/289 |
| 4,601,438 A | * | 7/1986 | Young | 242/289 |
| 5,308,021 A | * | 5/1994 | Ikuta | 242/289 |
| 5,356,090 A | * | 10/1994 | Sato | 242/289 |
| 5,362,011 A | * | 11/1994 | Sato | 242/289 |
| 5,372,324 A | * | 12/1994 | Sato | 242/289 |
| 5,393,005 A | * | 2/1995 | Nakajima | 242/289 |
| 5,865,387 A | * | 2/1999 | Hirano | 242/289 |
| 6,196,485 B1 | * | 3/2001 | Sato | 242/289 |
| 6,254,021 B1 | * | 7/2001 | Morimoto et al. | 242/289 |
| 6,328,240 B1 | * | 12/2001 | Sakaguchi et al. | 242/289 |

* cited by examiner

*Primary Examiner*—Emmanuel Marcelo
(74) *Attorney, Agent, or Firm*—Liniak, Berenato & White

(57) ABSTRACT

A annular braking portion 18 is provided to an annular braking body 4 made capable of axially moving back and forth by a regulating member including a knob.

The baffled support member 7 of a centrifugal brake unit C is fitted to a spool shaft 12, and a braking member 8 is clamped between the support member 7 and the urging member 6 of a urging member. A braking portion 8a is arranged so that it may always be separated from the annular braking face 'a' of an annular braking portion 18 with the arm piece 6g of an urging member 6.

27 Claims, 18 Drawing Sheets

FISHING REEL

BACKGROUND OF THE INVENTION

1. Technical Field

The present invention relates to an improvement in a fishing reel having a centrifugal brake unit utilizing centrifugal force for applying braking force to the rotation of a spool rotatably supported by a reel body.

2. Related Art

There have already been proposed centrifugal brake units so designed as to be able to regulate braking force in response to the condition of the fishing place in, for example, Japanese Utility Model Registrations No. 2, 538, 904 and No. 2, 535, 505.

The former (Japanese Utility Model Registration No. 2, 538, 904) is arranged such that a lever-like member is provided in the end portion of a spool shaft and directed radially; a plastic cylindrical braking piece is externally slidably fitted to the lever-like body; a metal cylindrical frictional member is disposed outside the rotational locus of the braking piece and formed into a centrifugal type; an inner peripheral face that the braking piece of the friction member contact is made to have axially different inner peripheral diameters or have different frictional coefficients; the frictional member is externally operated to be axially movable so as to adjust the braking force. On the other hand, the latter (Japanese Utility Model Registrations No. 2, 535, 505) is arranged so that the contact of a braking piece with respect to a frictional member may be turned ON/OFF by selectively regulating the movement of the braking piece.

In the former case, the problem is that the radially movable braking piece falls out diametrically onto the lever-like body during the work of detaching the spool from the reel body, and may be lost when the frictional member is moved through the external operation, the braking piece moves unstably and comes to contact with the frictional member, thus resulting in making the adjusting operation impossible.

As the braking piece also comes to contact the frictional member during the casting operation in the low-speed rotational range of the spool when the braking force is almost unnecessary, the former case is not fit for a short casting operation.

In the latter case, the problem is that no delicate adjustment is possible and because the brake block is designed to be selectively brought into contact with and separated from brake shoes, while the selective operation is conducted in the contact condition, braking is applied in the low-speed rotational range of the spool when the braking force is almost unnecessary, and in the separated condition, fishing is carried out while no braking is applied even though an attempt is made to actuate the braking force.

Problems to be Solved by the Invention exist in the fact that in the former case the stable casting performance is unobtainable in the low-speed rotational range of the spool and that in the latter case no delicate adjustment is possible as well as making it necessary to select either applying the braking or entirely applying no braking.

SUMMARY OF THE INVENTION

An object of the present invention in view of the foregoing problems is to provide a fishing reel which is capable of delicately adjusting braking force using centrifugal force but designed to apply no braking force in the low-speed rotational range of a spool.

In order to solve the foregoing problems according to the present invention, a fishing reel includes:

a reel body;

a spool rotatably supported by the reel body;

a support member integrally rotatable with the spool;

at least one braking member supported by the support member and movable in radial direction with respect to the support member;

an annular braking surface provided at the reel body, adapted to cover an outer periphery of the support member, movable with respect to the support member in an axial direction and having different frictional characteristic in the axial direction;

an urging member which urges the at least one braking member in a separating direction which the at least one braking member is separated from the annular braking surface, wherein the at least one braking member is brought into slidable contact with the annular braking face against urging force of the urging member by centrifugal force produced by a rotation of the spool;

a regulating member provided at outside of the reel body for moving the annular braking surface in the axial direction.

According to the present invention, wherein the urging force of the braking member can be adjustable.

According to the present invention, as it is unnecessary to apply braking in the low-speed rotational range of a spool, excellent spool free rotation is available so that fishing tackles may be played out toward a desired point, thus facilitating short casting. At the same time, as braking force is adjustable through operation from the outside to broadly deal with the condition of a fishing place.

According to the present invention, as braking force is adjustable internally and externally by making the urging force of a braking member operated by centrifugal force, the braking force can delicately adjusted. Further, a suitable spool braking operation corresponding to various circumstances becomes possible.

DETAILED DESCRIPTION OF THE PREFERRED EMBODIMENT

Figure 1:
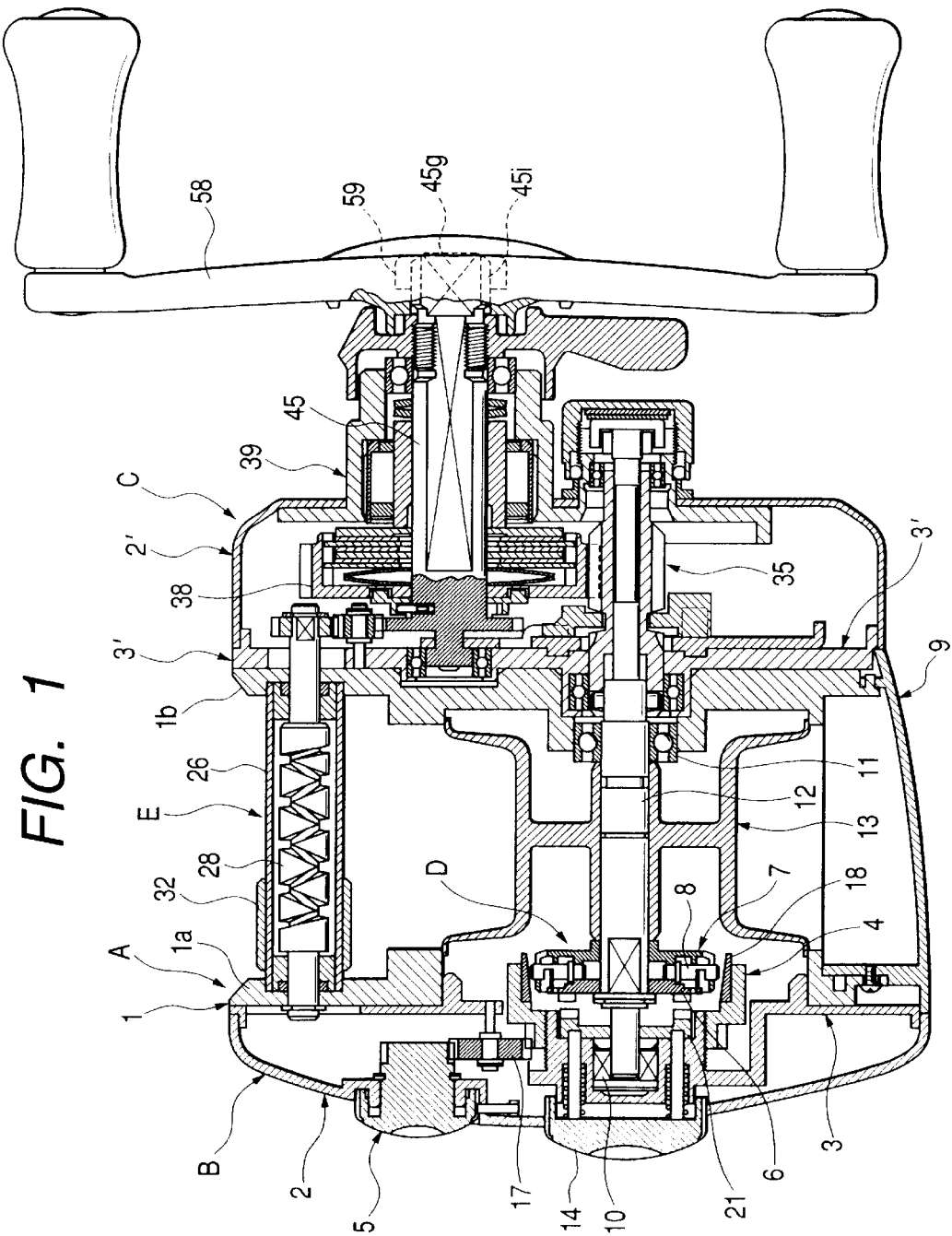
FIG. 1 is a sectional plan view of the double shaft receiving type reel for fishing according to a first embodiment of the invention.
Figure 2:
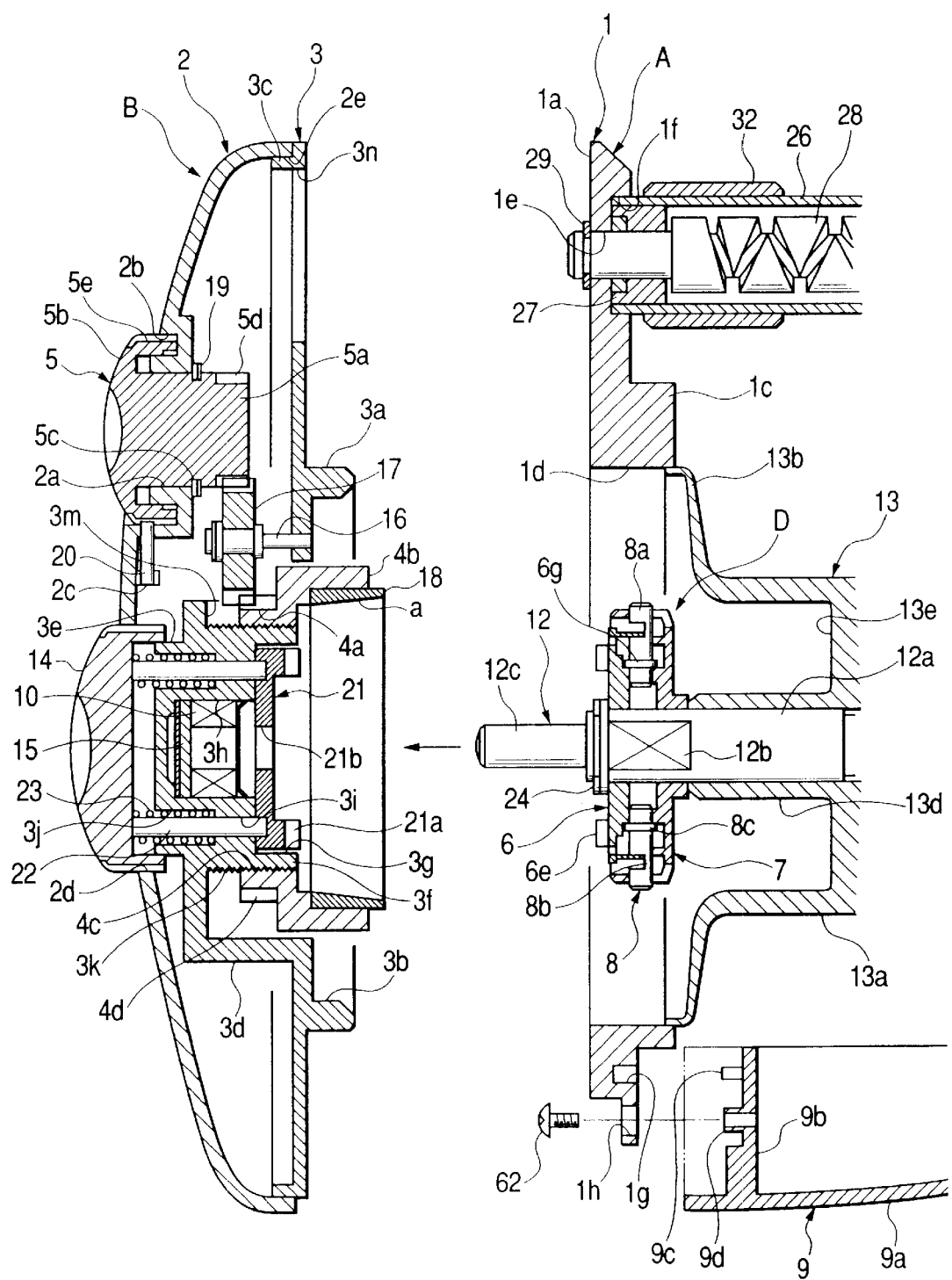
FIG. 2 is an enlarged sectional plan view on the counter handle side and an enlarged sectional plan view of a side plate unit of the double shaft receiving type reel for fishing.
Figure 3:
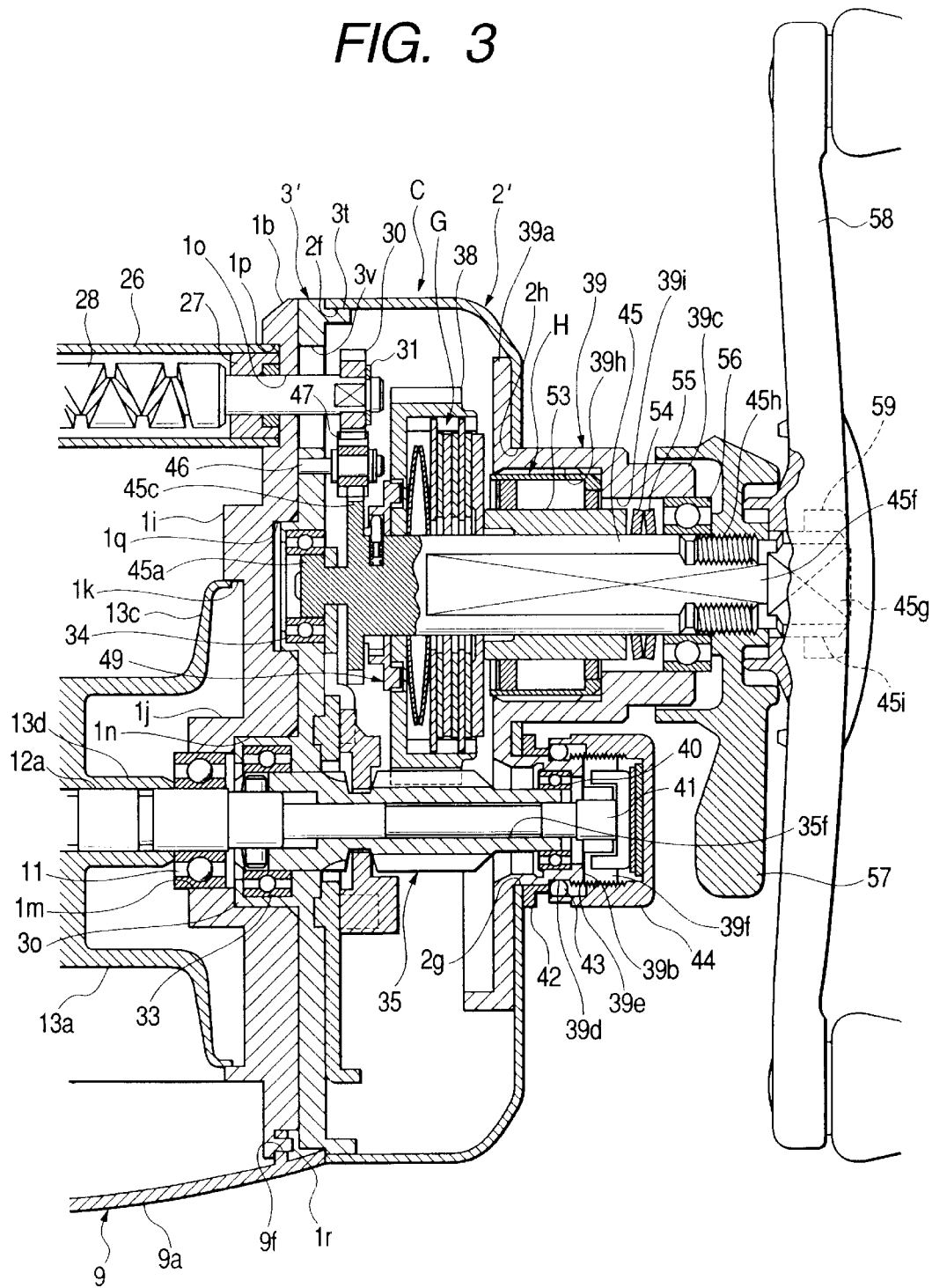
FIG. 3 is an enlarged sectional plan view on the handle side of the double shaft receiving type reel for fishing.
Figure 4:
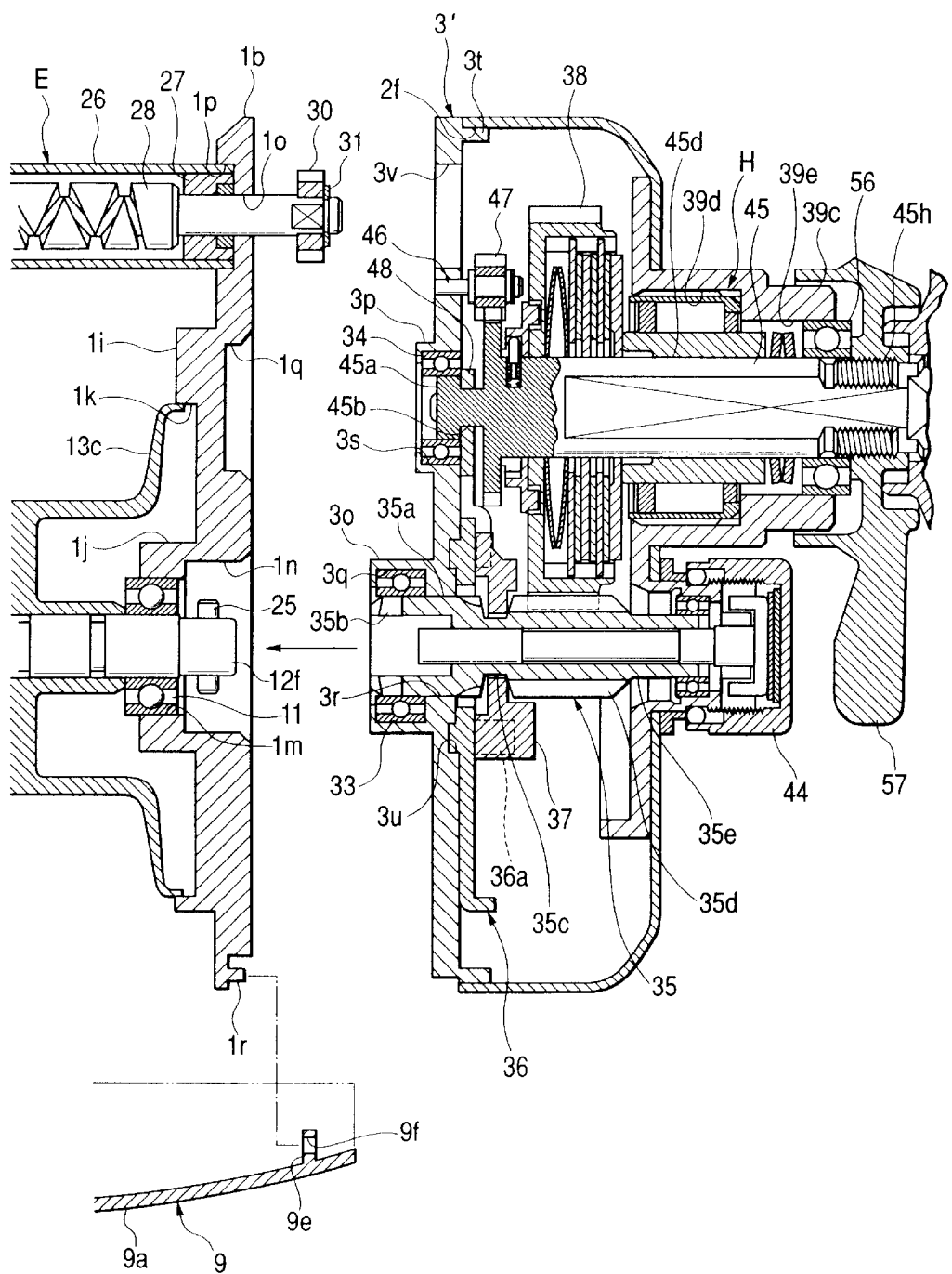
FIG. 4 is an enlarged sectional plan view on the handle side of the double shaft receiving type reel for fishing and an enlarged sectional side view of the separated side plate unit.
Figure 5:
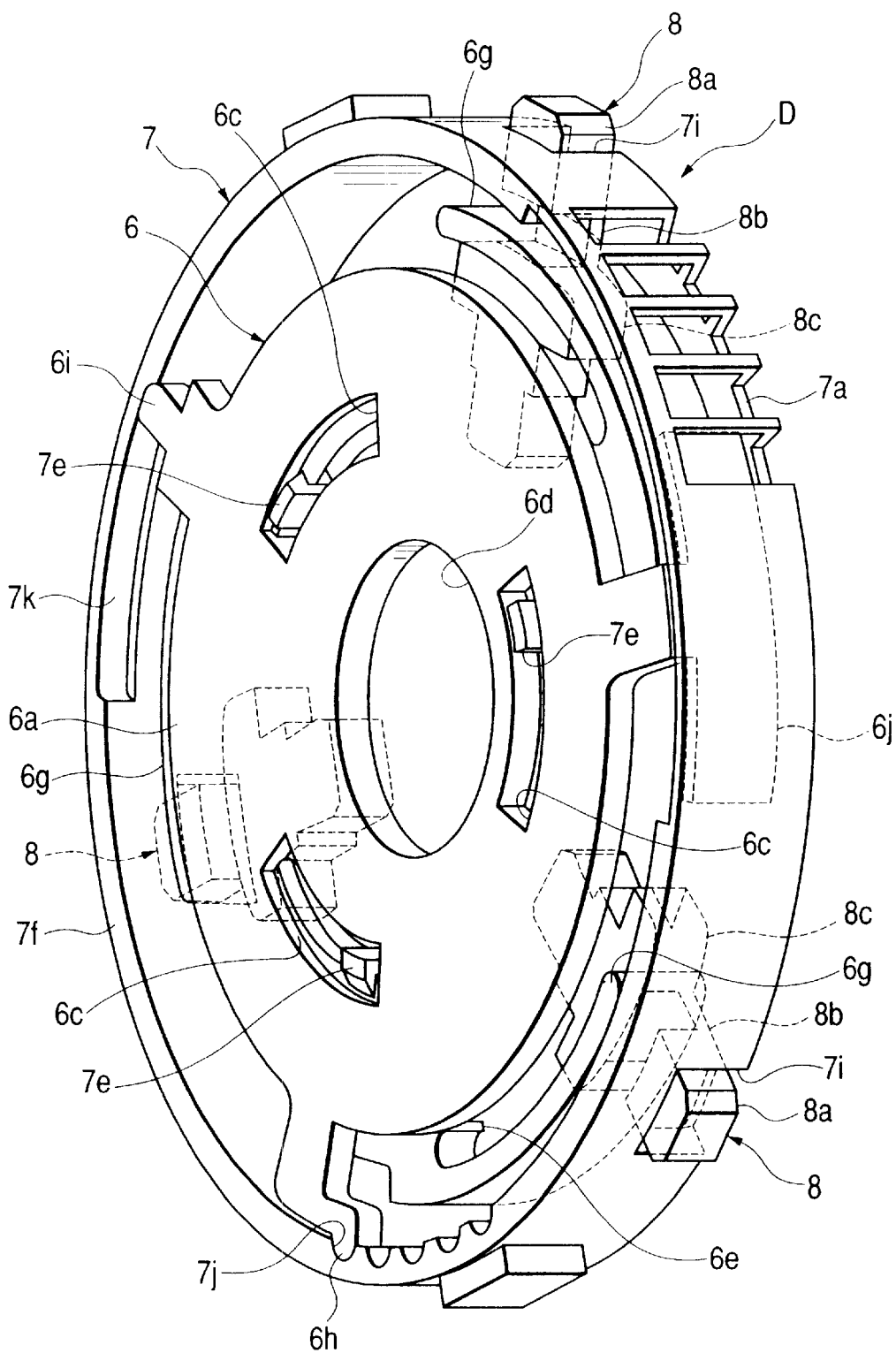
FIG. 5 is a perspective view of a centrifugal brake unit in a weak urging condition.
Figure 6:
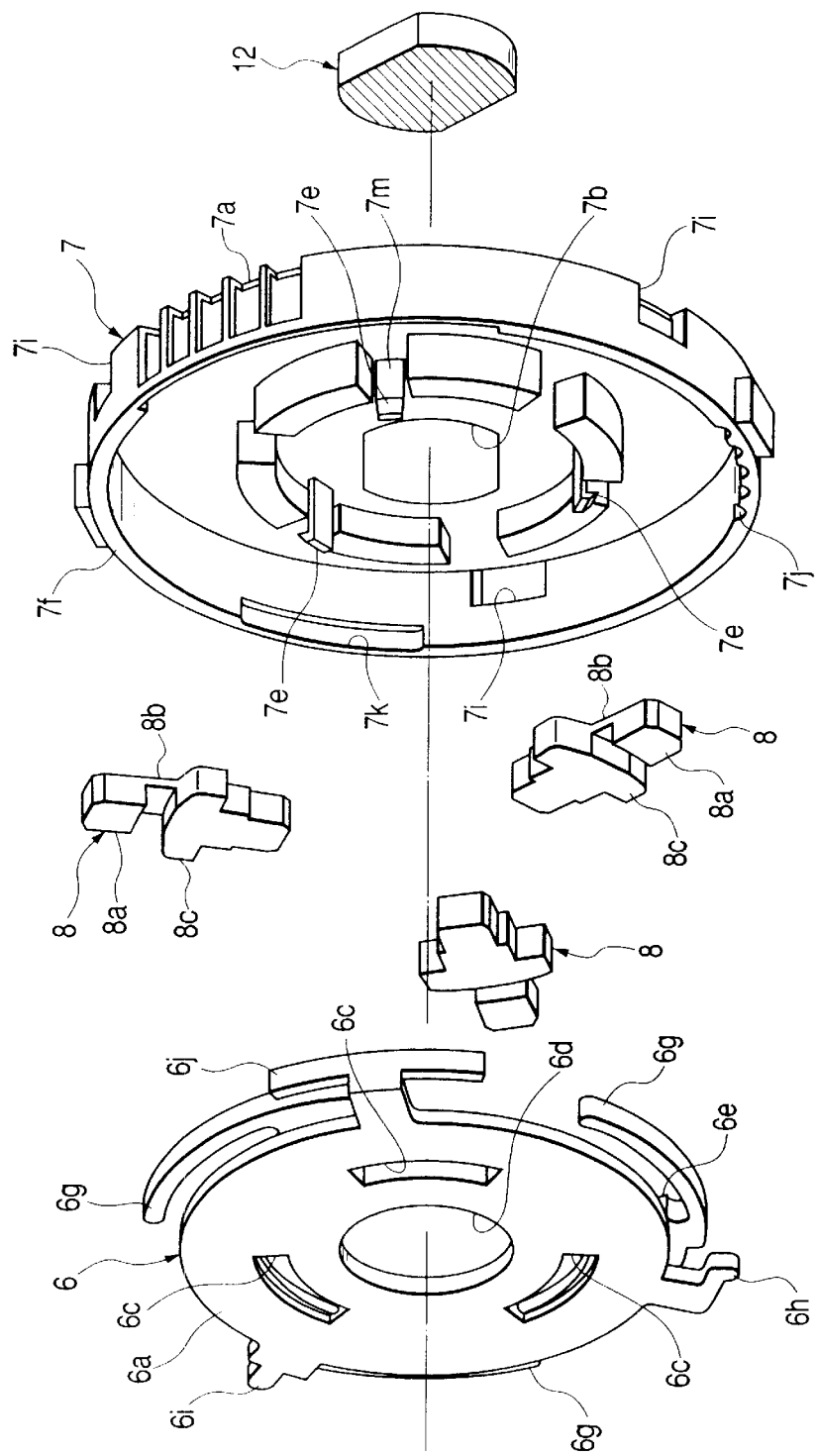
FIG. 6 is an exploded perspective view of the centrifugal brake unit.
Figure 7:
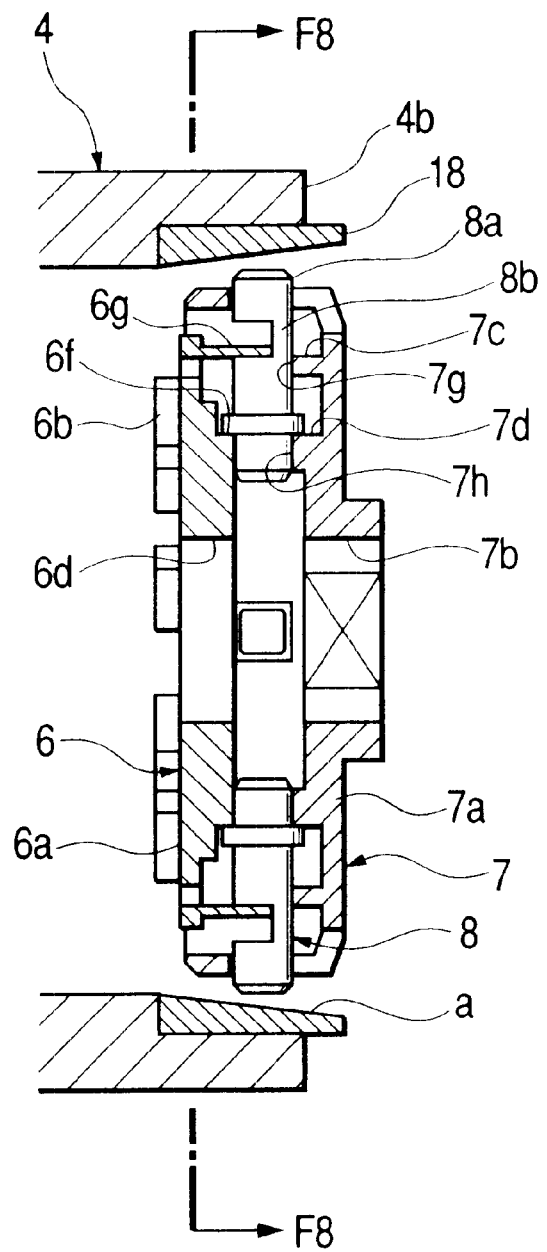
FIG. 7 is a sectional plan view of the centrifugal brake unit.
Figure 8:
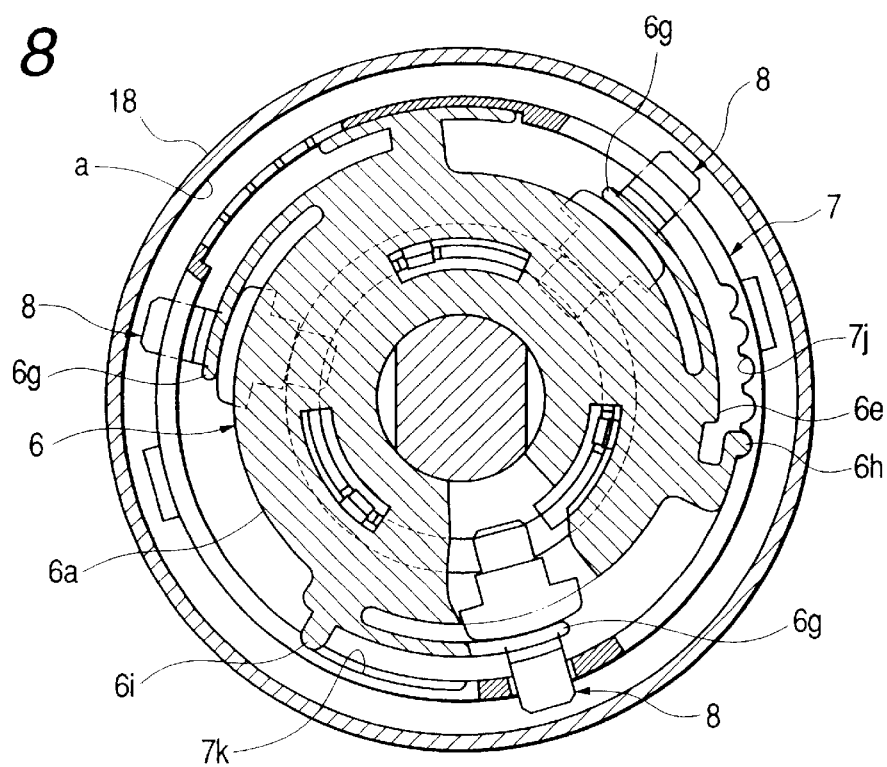
FIG. 8 is a sectional side view of the centrifugal brake unit in the weak urging condition taken on line F8—F8 of FIG. 7.
Figure 9:
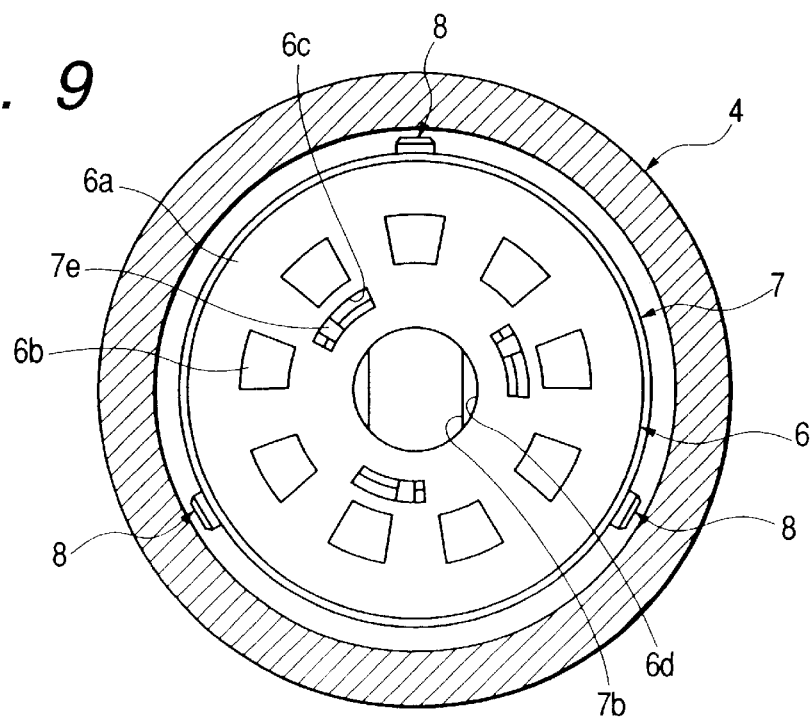
FIG. 9 is a sectional side view of the annular braking body of the centrifugal brake unit.
Figure 10:
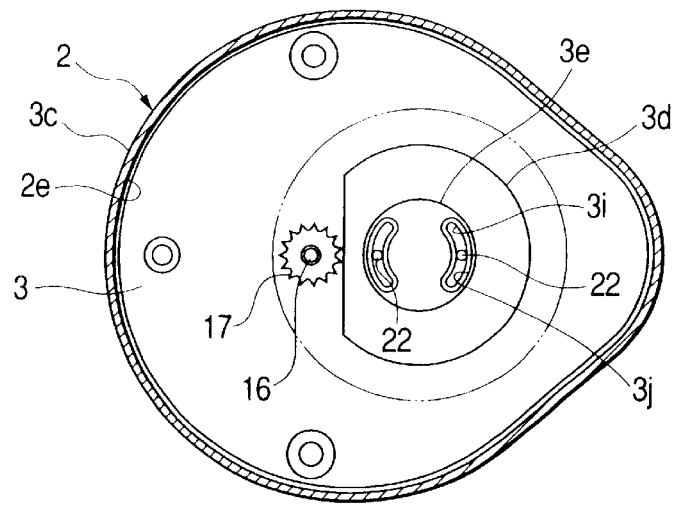
FIG. 10 is a sectional side view of the side plate unit on the counter handle side.
Figure 11:
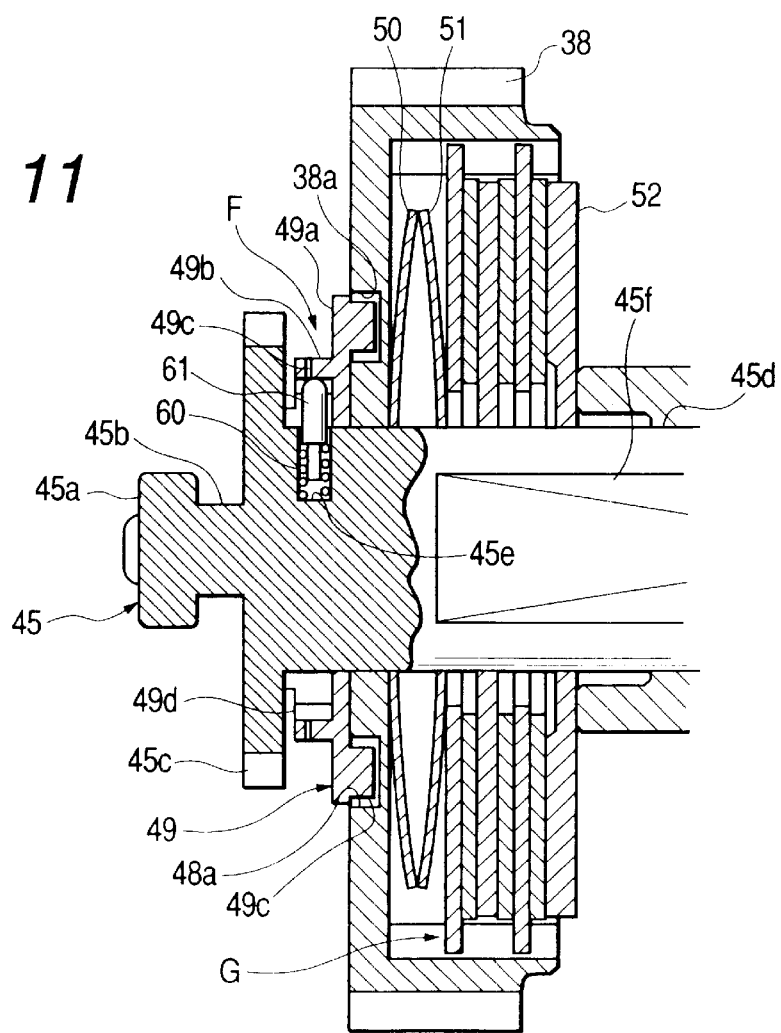
FIG. 11 is an enlarged sectional plan view around a handle shaft.
Figure 12:
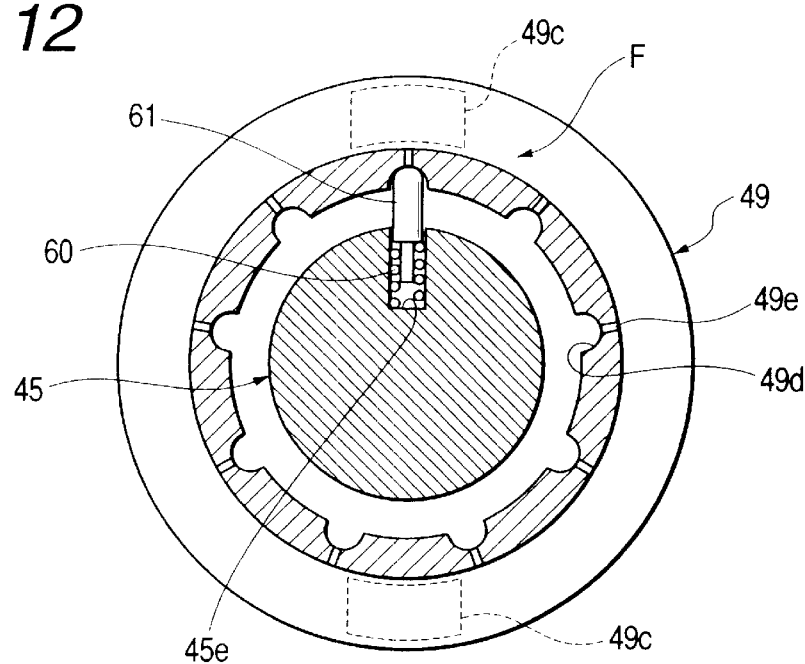
FIG. 12 is a sectional side view of a click unit.
Figure 13:
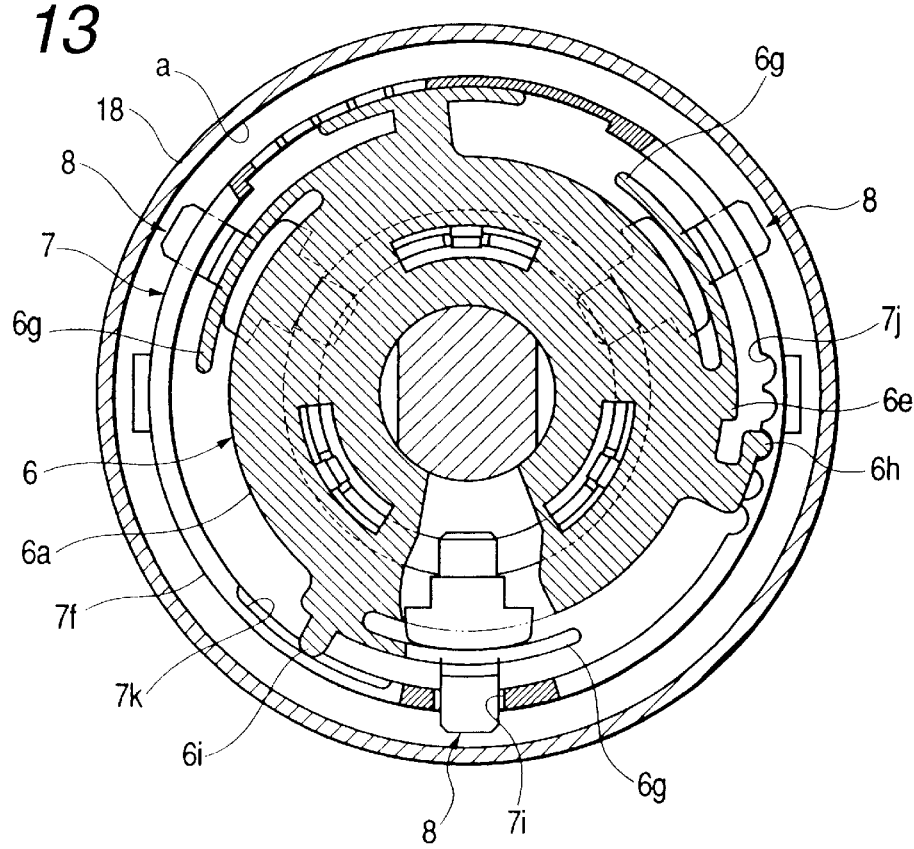
FIG. 13 is a sectional side view of the centrifugal brake unit in an intermediate urging condition.
Figure 14:
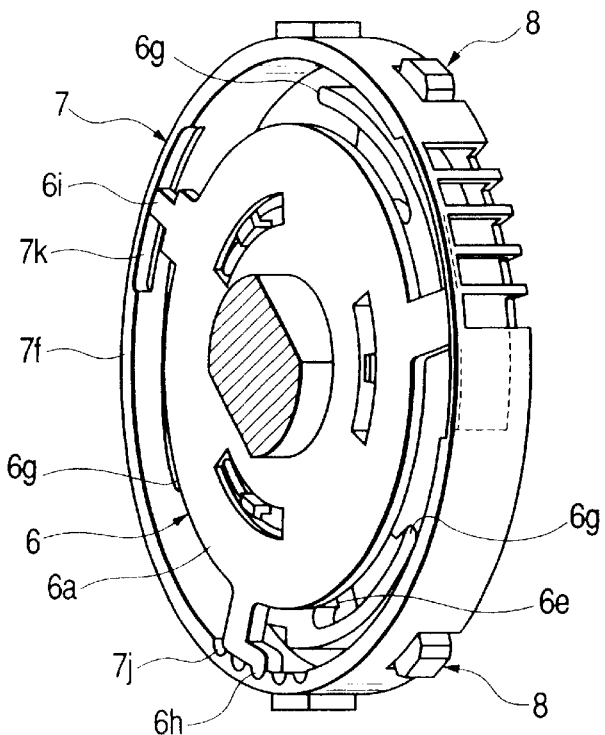
FIG. 14 is a perspective view of the centrifugal brake unit in the intermediate urging condition.
Figure 15:
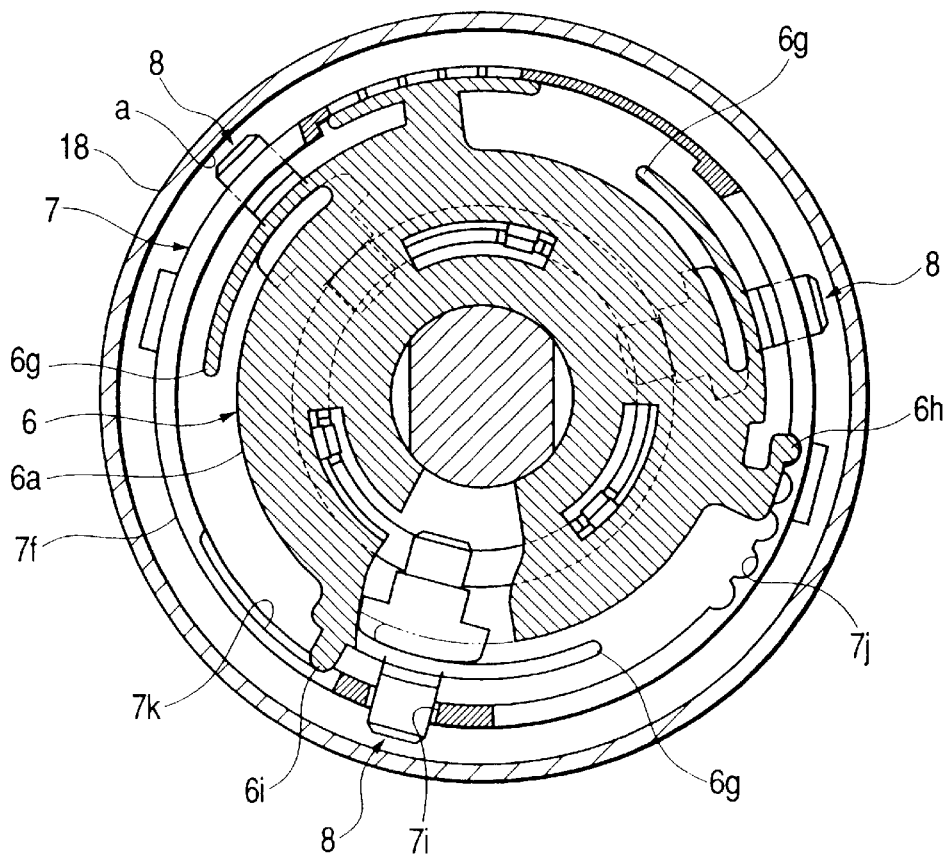
FIG. 15 is a sectional side view of the centrifugal brake unit in a strong urging condition.
Figure 16:
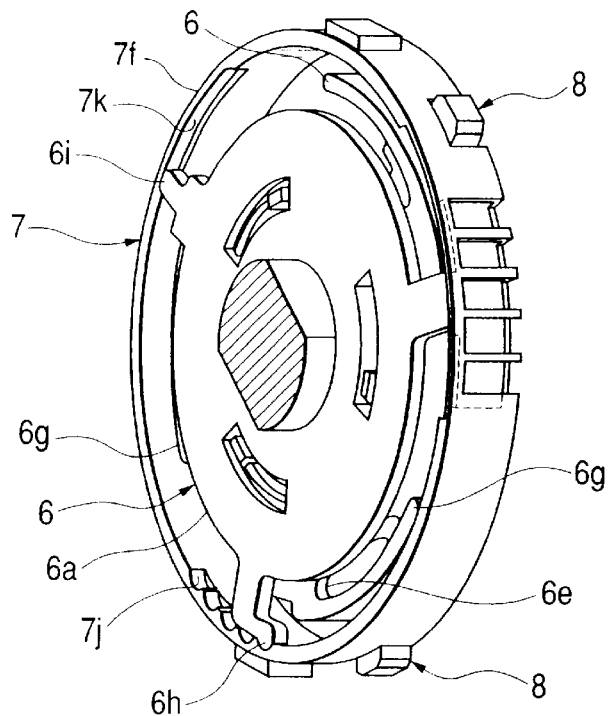
FIG. 16 is a perspective view of the centrifugal brake unit in the strong urging condition.

Embodiments of the invention will now be described with reference to the drawings. FIGS. 1 to 16 refer to a fishing reel in the form of a double shaft receiving type reel for fishing as a first embodiment of the invention. FIG. 1 is a sectional plan view of the double shaft receiving type reel for fishing. FIG. 2 is an enlarged sectional plan view on the counter handle side and an enlarged sectional plan view of the side plate unit of the double shaft receiving type reel for fishing. FIG. 3 is an enlarged sectional plan view on the handle side of the double shaft receiving type reel for fishing. FIG. 4 is an enlarged sectional plan view on the handle side of the double shaft receiving type reel for fishing and an enlarged sectional side view of the separated side plate unit. FIG. 5 is a perspective view of a centrifugal brake unit in a weak urging condition. FIG. 6 is an exploded perspective view of the centrifugal brake unit. FIG. 7 is a sectional plan view of the centrifugal brake unit. FIG. 8 is a sectional side view of the centrifugal brake unit in the weak urging condition taken on line F8—F8 of FIG. 7. FIG. 9 is a sectional side view of the annular braking body of the centrifugal brake unit. FIG. 10 is a sectional side view of the side plate unit on the counter handle side. FIG. 11 is an enlarged sectional plan view around a handle shaft. FIG. 12 is a sectional side view of a click unit. FIG. 13 is a sectional side view of the centrifugal brake unit in an intermediate urging condition. FIG. 14 is a perspective view of the centrifugal brake unit in the intermediate urging condition. FIG. 15 is a sectional side view of the centrifugal brake unit in a strong urging condition. FIG. 16 is a perspective view of the centrifugal brake unit in the strong urging condition.

A reel body A of a double shaft receiving type reel for fishing includes a side frame 1 and a left and a right side plate unit B and C, and have a substantially circular shape in side view.

The side plate unit B on the counter handle side includes a side plate 2 and an inner side plate 3. The side plate unit C on the handle side includes a side plate 2' and an inner side plate 3'.

The left and right side frames 1a and 1b of the side frame 1 are held integrally in parallel with a plurality of struts (not shown) and the stationary plate of a reel leg. The inner side plate 3 and the side plate 2 of the side plate unit B are externally and detachably fitted to the side frame 1a, and the inner side plate 3' and the side plate 2' of the side plate unit C are externally and detachably fitted to the side frame 1a, these plates being fitted with a plurality of set screws (not shown).

A spool shaft 12 is rotatably supported by a bearing 10 fitted to the inner side plate 3 and a bearing 11 fitted to the side frame 1b. A spool 13, to which the large-diameter portion 12a of the spool shaft 12 is fixed, is disposed between both side frames 1a and 1b.

The spool 13 is formed with a fishline winding body portion 13a on which a fishline (not shown)is wound, flange portions 13b and 13c on both sides and a central cylindrical shaft portion 13e.

As shown in FIGS. 1 and 2, the left side frame 1a is formed with a projected portion 1c on the right side and a large-diameter through-hole 1d is formed within the projected portion 1c. A through-hole 1e is formed on the front side of the left side frame 1a. A recessed portion 1f is opened in the right side thereof.

A positioning hole 1g is formed in the lower right side of the left side frame 1a of FIG. 2, and an idle hole 1h is formed in the thin-walled portion thereof.

The flange portion 13b of the spool 13 is inserted into the through-hole 1d.

As shown in FIGS. 1, 3 and 4, a projected portion 1i and a cylindrical portion 1j are formed on the left side of the side frame 1b. A large-diameter recessed portion 1k is formed within the projected portion 1i thereof.

A through-hole 1m is formed within the cylindrical portion 1j, and a recessed portion in is opened in the right side.

The bearing 11 is mounted within the through-hole 1m.

A through-hole 1o and a recessed portion 1p are formed on the front side of the side frame 1b.

A recessed portion 1q is formed in the right side of the side frame 1b.

A pin 1r is formed on the right side of the lower thin-walled portion of the side frame 1b of FIG. 4.

The flange portion 13c of the spool 13 is inserted in the recessed portion 1k.

As shown in FIG. 2, the side plate 2 and the inner side plate 3 of the side plate unit B are combined integrally. The side plate 2 includes: a through-hole 2a in which a regulating member 5 having the knob of the annular braking body is pivotally held; a recessed portion 2b; a plate spring holding portion 2c; and a through-hole 2d into which the adjusting knob 14 of the urging member 6 of an urging mechanism is pivotally inserted.

A large-diameter cylindrical portion 3a is formed on the right side of the inner side plate 3, and a recessed portion 3b is formed inside the cylindrical portion 3a.

A cylindrical portion 3c smaller in diameter than the outer periphery of the inner side plate 3, a large diameter closed-end cylindrical portion 3d and a projected portion 3e are formed on the left side of the inner side plate 3. A columnar portion 3f is formed within the cylindrical portion 3d.

A large-diameter recessed portion 3g and a small-diameter deep recessed portion 3h are formed in the right face of the columnar portion 3f.

As shown in FIGS. 2 and 10, arcuate through-holes 3i and i and arcuate hole portions 3j and 3j greater than the through-holes 3i and 3i are formed around the deep recessed portion 3h of the columnar portion 3f.

A screw portion 3k is formed on the outer periphery of the columnar portion 3f.

An upper opening 3m of FIG. 2 is formed in front of the large-diameter cylindrical portion 3d.

A thrust shaft receiving plate 15 and bearing 10 are mounted within the small-diameter deep recessed portion 3h.

A through-hole 3n is formed on the front side of the inner side plate 3.

The cylindrical portion 3a of the inner side plate 3 is fitted into the through-hole 1d of the left side frame 1a, and the opening 2e of the side plate 2 is fitted to the outer periphery of the cylindrical portion 3c.

A shaft portion 16 is fixed to the inner side plate 3 so as to support a gear 17.

In the annular braking body 4, cylindrical portions 4a and 4b are integrally formed in a sectionally boss formed. A screw portion 4c is formed on the inner periphery of the cylindrical portion 4a. A gear portion 4d is formed on the outer periphery of the cylindrical portion 4a, so that the annular braking portion 18 is fixed to the inner periphery of the cylindrical portion 4b.

The screw portion 4c is screwed into the screw portion 3k.

The gear portion 4d is engaging with the gear 17.

As shown in FIGS. 1, 2 and 7, the annular braking portion 18 is formed on an annular braking face 'a' having a tilted inner periphery.

The regulating member 5 having the knob is formed with a columnar portion 5a, a knob portion 5b, a peripheral groove 5c and a gear portion 5d on the outer periphery of the columnar portion 5a, and an uneven portion 5e on the outer periphery of the knob portion 5b.

A washer and E-ring 19 are fitted into the peripheral groove 5c for the prevention of slipping-off.

The gear portion 5d is engaged with the gear 17.

A blade spring 20 fixed to the blade spring holding portion 2c is engaged with the uneven portion 5e.

The operating ring 21 of the urging member 6 is fitted into a large diameter recessed portion 3g on the right face of the columnar portion 3f. Ends of two operating levers are fixed to the adjusting knob 14. The operating levers are fixedly press-fitted into the hole of an operating ring 21 after being inserted into the arcuate through-holes 3i and 3i.

The adjusting knob 14 and the operating ring 21 are urged to the left by a spring 23 inserted into the arcuate hole portions 3j and 3j.

A plurality of bosses 21a is peripherally disposed on the right face of the operating ring 21. The through-hole 21b is formed in the center of the operating ring 21.

The spool shaft 12 is formed with the large-diameter portion 12a, an outer peripheral baffle portion 12b on the left side of the large-diameter portion 12a, a small-diameter portion 12c, and a peripheral groove.

The cylindrical shaft portion 13d of the spool 13 is fixed to the large-diameter portion 12a, and the support member 7 of the centrifugal brake unit D is mounted in a baffle mode.

The small-diameter portion 12c is supported by the bearing 10.

The centrifugal brake unit D includes the urging member 6, the support member 7 and the braking member 8 as the urging mechanism. Further, the E-ring 24 is fitted into the peripheral groove of the spool shaft 12 on the left face of the urging member 6 for the prevention of slipping off.

As shown in FIGS. 3 and 4, the right side of the large-diameter portion 12a is supported by the bearing 11 fitted to the side frame 1b. A small-diameter portion 12f is formed on the right side of the large-diameter portion 12a, so that a mating pin 25 is fixed in a manner perpendicular to the small-diameter portion 12f.

As shown in FIGS. 1, 2 and 7, the urging member 6 of the centrifugal brake unit D is such that a plurality of boss portions 6b are peripherally disposed on the left face of a disk 6a; a plurality of peripheral arcuate retaining holes 6c are formed in the disk 6a around the through-hole 6d; a plurality of projections 6e and cylindrical portions 6f are formed on the right face of the disk 6a as shown in FIGS. 5 to 8.

An arm piece 6g peripherally extending is formed in each projected portion 6e.

A boss-like click portion 6h having spring property is formed on one outer periphery of the projected portion 6e; a boss-like pivotal angle regulating portion 6i is formed on one outer periphery of another projected portion 6e; and a peripheral holding plate 6j is formed on one outer periphery of still another projected portion.

The support member 7 is in the form of a cup, and includes: a baffle through-hole 7b in the center of a base plate 7a; double cylindrical portions 7c and 7d formed outer periphery of the through-hole 7b; a retaining pawl 7e formed in an arm portion 7m axially extending, and a cylindrical portion 7f formed on the outer periphery of the base plate 7a.

A plurality of radial grooves 7g and 7h are formed in the cylindrical portions 7c and 7d.

A plurality of radial through-holes 7i are formed in the outer peripheral cylindrical portion 7f.

A plurality of click recessed portions 7j and pivotal angle regulating recessed portions 7k are formed in the inner periphery of the cylindrical portion 7f.

The braking member 8 includes a braking portion 8a, a coupling portion 8b, and a weight portion 8c, the coupling portion 8b being U-shaped in section.

When the centrifugal brake unit D is fabricated, the braking portion 8a of the braking member 8 is inserted into the through-hole 7i of the support member 7, and the weight portion 8c is inserted into the grooves 7g and 7h of the support member 7.

Then the urging member 6 is inserted into the outer peripheral cylindrical portion 7f of the support member 7, and the arm piece 6g is inserted into the coupling portion 8b of the support member 8 and further the retaining pawl 7e is retained by the retaining hole 6c.

At this time, the click portion 6h is inserted into the click recessed portion 7j, and the pivotal angle regulating portion 6i is inserted into the pivotal angle regulating recessed portion 7k.

Both ends of the guide cylindrical 26 of a level wind mechanism E are fitted into the recessed portion 1f of the left side frame 1a and the recessed portion 1p of the side frame 1b, and bearings 27 and 27 are fixed to both ends of the guide cylinder 26, respectively.

A traverse cam shaft 28 is fitted to the bearings 27 and 27, and an E-ring 29 is fitted to one end projecting from the through-hole 1o, and a gear 30 is fitted to the other end projecting from the through-hole 1o and baffled and prevented from slipping off with an E-ring 31.

A fishline guide cylindrical body 32 is fitted to the outer periphery of the guide cylinder 26 in a manner capable of reciprocating and a mating pawl (not shown) is provided within the fishline guide cylindrical body 32 so as to mate with the cam groove of the traverse cam shaft 28.

The side plate 2' and the inner side plate 3' of the side plate unit C are combined integrally.

Cylindrical portions 3o and 3p are formed on the left side of the inner side plate 3'.

A recessed portion 3q and a through-hole 3r opened to the left side are formed within the cylindrical portion 3o, and a bearing 33 is mounted in the recessed portion 3q.

A recessed portion 3s opened to the right side is formed within the cylindrical portion 3p of the inner side plate 3', and a bearing 34 is mounted in the recessed portion 3s.

A cylindrical portion 3t smaller in diameter than the outer periphery of the inner side plate 3', and a recessed portion 3u are formed on the right side of the inner side plate 3'.

A through-hole 3v is formed on the front side of the inner side plate 3'.

The opening 2f of a side plate 2' is fitted to the outer periphery of the cylindrical portion 3.

The cylindrical portion 3o of the side plate 3' is inserted into the recessed portion in of the side frame 1b, and the cylindrical portion 3p of the inner side plate 31 is inserted into the recessed portion 1q of the side frame 1b.

A cylindrical portion 35a at one end of a pinion 35 is axially movably is mated with the bearing 33 and the through-hole 3r.

A clutch actuator 36 is pivotally fitted into the recessed portion 3u, and a clutch cam 36a is formed on the clutch actuator 36.

A mating portion 35b having a vertical groove is formed on the edge face of the cylindrical portion 35a.

The pinion 35 is formed with a peripheral groove 35c, a gear portion 35d, a small-diameter portion 35e and a through-hole 35f.

A clutch body 37 is inserted into the peripheral groove 35c.

A driving gear 38 frictionally coupled to a handle shaft 45 is engaging with the gear portion 35d.

The small-diameter portion 35e is supported by a bearing 40 mounted in a bearing structure 39 fitted inside the side plate 2'.

A shaft lever 41 is fitted into the through-hole 35f.

Through-holes 2g and 2h are bored in the side plate 2'.

In the bearing structure 39 mounted inside the side plate 2', a cylindrical portion 39b opened to the left is formed on the right side of a disk portion 39a, and a double-deck cylindrical portion 39c having an outer diameter greater than the cylindrical portion 39b is formed on the right side thereof.

The cylindrical portions 39b and 39c are inserted into the respective through-holes 2g and 2h and projected therefrom.

A peripheral groove 39d, a screw portion 39e and a slot 39f are formed on the outer periphery of the cylindrical portion 39b.

The other end of the small-diameter portion 35e of the pinion 35 is supported by the bearing 40 inserted into the cylindrical portion 39b.

The outer periphery of the cylindrical portion 39b of the bearing structure 39 is inserted into the through-hole 2g and a boss-shaped collar 42 in section is mounted therein and further an O-ring 43 is fitted into the peripheral groove 39d.

An adjusting knob 44 is screwed into the screw portion 39e of the bearing structure 39, and a shaft lever 41 is pressed against the edge face of the small-diameter portion 12f of the spool shaft 12 by the adjusting knob 44.

The handle shaft 45 is formed with a one-end collar portion 45a, a small-diameter portion 45b, a gear 45c, a large-diameter portion 45d, the hole 45e of the large-diameter portion 45d, an outer-peripheral baffle portion 45f, a baffle portion 45g at the other end of the large-diameter portion 45d, an outer-peripheral screw portion 45h at the other end of the large-diameter portion 45d, and a screw portion 45i at the other end thereof. The gear 45c is formed integrally with the large-diameter portion 45d and the gear 30 of the level wind mechanism E is engaging with the gear 45c via an intermediate gear 47 supported by a shaft portion 46 fixed to the inner side plate 3'.

The bearing 34 is inserted into the recessed portion 3s of the inner side plate 3', and the one-end collar portion 45a of the handle shaft 45 is fitted into and supported by the recessed portion 35.

The bearing 34 and the collar portion 45a are stopped from slipping off by a stopper plate 48.

The cylindrical member 49 of a click unit F, the driving gear 38, two sheets of sprig plates 50, 51, the braking member G, a presser plate 52, an inner ring 53 including the collar of a rolling type unidirectional clutch H, two sheets of spring plates 54 and 55, and a bearing 56 are fitted to the outer periphery of the large-diameter portion 45d of the handle shaft 45. A drag braking regulating handle 57 is screwed into the screw portion 45h.

The handle 58 is fitted to the baffle portion 45g for baffling purposes and prevented from slipping off by a box nut 59.

The cylindrical member 49 of the click unit F is formed integrally with a disk 49a and cylindrical portion 49b and includes a boss portion 49c on the right side of the disk 49a. An uneven portion 49d is formed on the inner periphery of the cylindrical member 49b, and a plurality of sound radiating holes 49e are formed in the cylindrical portion 49b.

A spring 60 and a click pin 61 are inserted into the hole 45e of the handle shaft 45.

A plurality of recessed portions 38a are formed on the left side of the driving gear 38, and the boss portion 49c formed on the cylindrical member 49 of the click unit F is inserted into the recessed portion 38a, and the rotation of the cylindrical member 49 is interlocking with the rotation of the driving gear 38.

A large-diameter through-hole 39h and a through-hole 39i smaller in diameter than the through-hole 39d are formed within the outer-diametrical double-deck cylindrical portion 39c of the bearing structure 39.

The rolling type unidirectional clutch H is inserted into the through-hole 39h, and the bearing 56 is inserted into the through-hole 39i.

The spool 13 is arranged so that it may be rotated via the clutch mechanism including the mating pin 25 of the spool shaft 12, the mating portion 35b of the pinion 35, the pinion 35, the driving gear 38, and the handle 58 fitted to the handle shaft 45.

A finger placing member 9 below the left side frame 1a of FIG. 2 and below the side frame 1b of FIG. 4 is loosely mounted and the position of the side plate unit C is determined by the side plate unit B and the side frame 1b.

The finger placing member 9 is formed with a finger placing portion 9a, a positioning pin 9c outside the one side wall surface 9b and a cylindrical portion 9d having a screw hole, a wall portion 9e with an idle hole 9f being formed on the other side.

The positioning pin 9c is inserted in the positioning hole 1g of the left side frame 1a, and a cylindrical portion 9d having a screw longer than the depth of the idle hole is inserted in the idle hole 1h, and the pin 1r of the side frame 1b is inserted into the through-hole 9f.

Then a machine screw 62 is screwed into the screw hole of the cylindrical portion 9d.

The operation of the double shaft receiving type reel for fishing is as follows: when the handle 58 is rotated in the direction of winding the fishline on the spool 13, the spool shaft 12 and the spool 13 are rotated via the handle shaft 45, the driving gear 38 and the pinion 35.

When the spool is reversely rotated as there is a tug on the line, a click sound is produced as the driving gear 38 and the cylindrical member 49 of the click unit F are also reversely rotated with respect to the handle shaft 45.

In the centrifugal brake unit D, the braking portion 8a of the braking member 8 is always separated from the annular braking face 'a' of the annular braking body 4 by the arm piece 6g of the urging member 6.

The operation of the centrifugal brake unit D is as follows: the annular braking face 'a' of the annular braking portion is axially moved back and forth through the pivotal operation of the regulating member 5 including the knob of the annular braking body 4. When the support member 6 of the urging mechanism of the centrifugal brake unit D is operated to pivot while the urging member 6 is exposed after the side plate unit B is separated from the side frame 1 or when the adjusting knob 14 of the urging member 6 of the urging member is operated to pivot, the arm piece 6g of the urging member 6 is pivoted with respect to the braking portion 8a so that the weak, intermediate or strong urging condition can be selected.

Even though the braking portion 8a is positioned at the free end at the tip of the arm piece 6g of the urging member 6, that is, in the weak urging condition, no braking force works in the low-speed rotational range of the spool.

With the double shaft receiving type reel for fishing thus arranged, as it is unnecessary to apply braking in the low-speed rotational range of the spool, excellent spool free rotation is available so that fishing tackles may be played out toward a desired point, thus facilitating short casting. At the same time, as braking force is adjustable through operation from the outside to broadly deal with the condition of a fishing place.

Further, the braking force becomes adjustable in both internal and external directions by making variable the urging force of the braking member acted by the centrifugal force. As the delicate adjustment of the braking force is possible, suitable spool braking operation corresponding to various situation can be performed.

Figure 17:
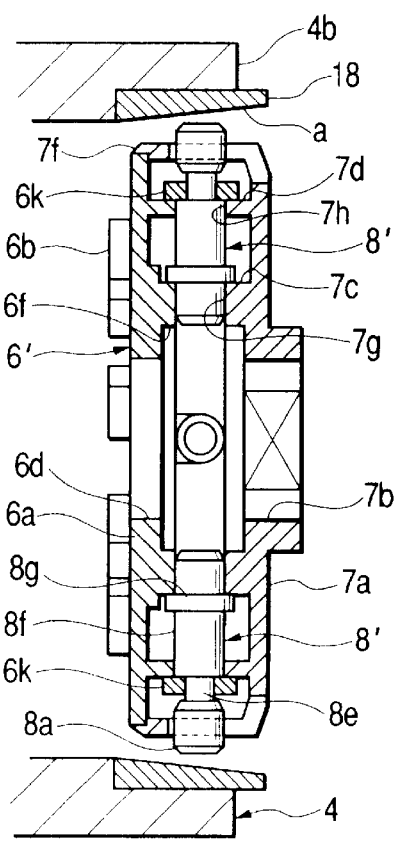
FIG. 17 is a sectional plan view of a centrifugal brake unit according to a second embodiment of the invention.
Figure 18:
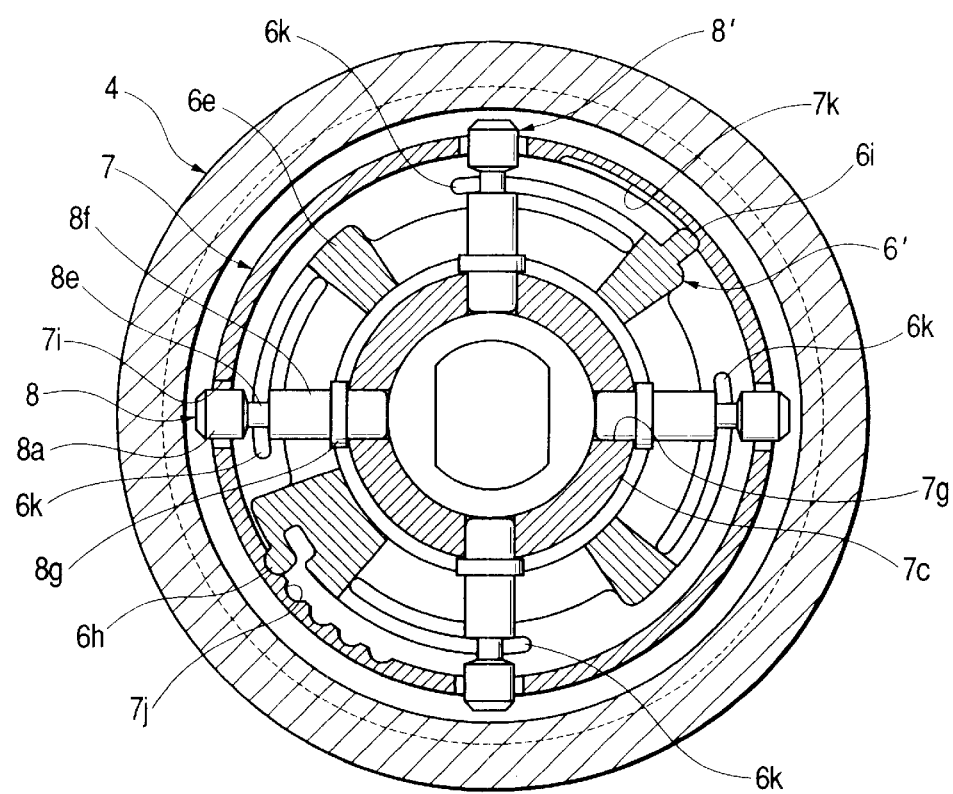
FIG. 18 is a sectional side view of the centrifugal brake unit.
Figure 19A:
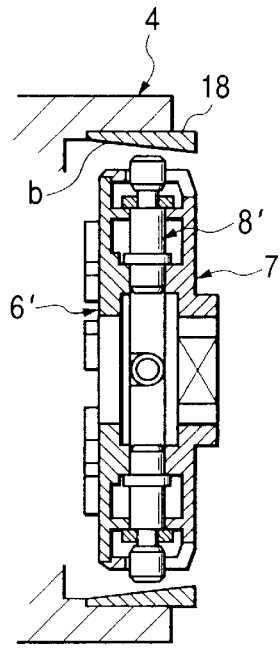
FIGS. 19 (A)–(F) shows modified examples of annular braking portions, wherein FIGS. 19 (A)–(F) refer to sectional plan view of the centrifugal brake units.
Figure 19B:
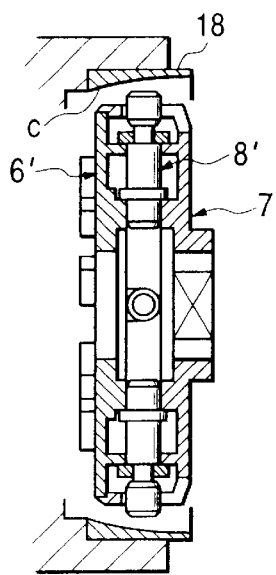
Figure 19C:
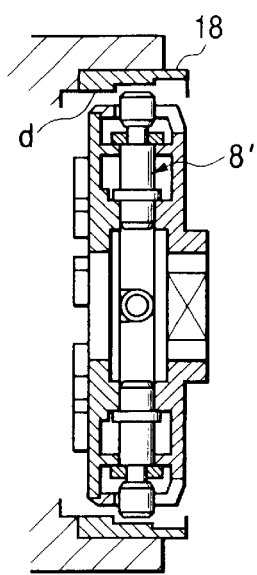
Figure 19D:
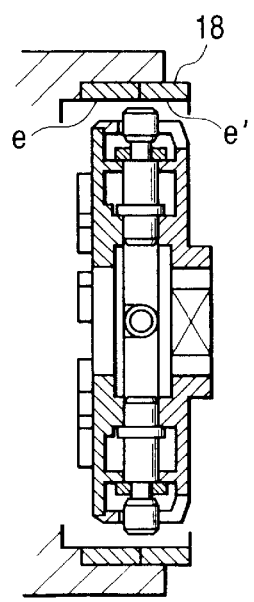
Figure 19E:
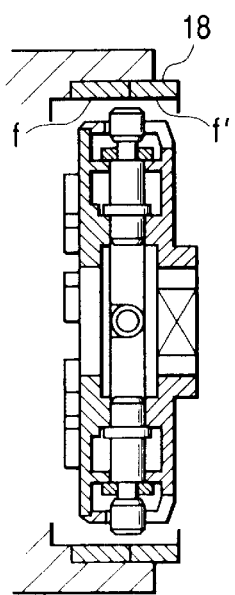
Figure 19F:
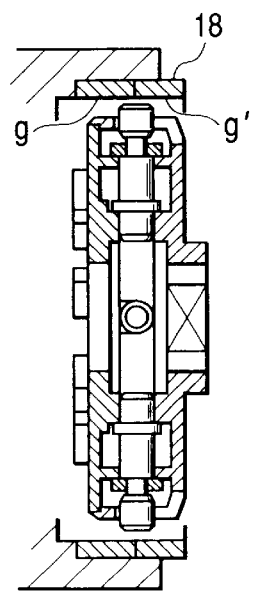

FIGS. 17 and 18 shows a second embodiment of the invention. FIG. 17 is a sectional plan view of a centrifugal brake unit. FIG. 18 is a sectional side view of the centrifugal brake unit.

In the urging member 6' of the centrifugal brake unit D according to the second embodiment of the invention, a plurality of boss portions 6b are peripherally formed on the left face of the disk 6a with the through-hole 6d in the center.

A plurality of projected portions 6e and a cylindrical portion 6f are formed on the right face of the disk 6a.

Two fork-like parallel arm pieces 6k each extending peripherally are formed in the projected portions.

The boss-like click portion 6h having spring property is formed on one outer periphery of the projection portion 6e. The boss-like pivotal angle regulating portion 6i is formed on one periphery of the other projected portion 6e.

The cylindrical portion 7f is formed on the outer periphery of the base plate 7a of the support member 7, and the disk 6a of the urging member 6' is fitted to the inner periphery of the cylindrical portion 7f.

A cylindrical braking member 8' is formed with a braking portion 8d, a neck portion 8e, a holding portion 8f and a collar portion 8g.

The rest of arrangement is substantially similar to that according to the first embodiment of the invention.

FIG. 19 shows modified examples of annular braking portions, wherein (a)–(f) refer to sectional plan view of the centrifugal brake units.

The annular braking face b of the annular braking portion 18 of the modified example (a) wherein the annular braking face is a tilted face opposite in direction to the annular braking portion (a) in the first and second embodiments of the invention.

The annular braking face c of the annular braking portion 18 of the modified example (b) is an arcuate face.

The annular braking face d of the annular braking portion 18 of the modified example (c) is a stepped horizontal face.

The annular braking face e of the annular braking portion 18 of the modified example (d) is formed of a plated face e' and a raw material face e".

The annular braking face f of the annular braking portion 18 of the modified example (e) is formed of a polished face f' and a roughly machined face f".

The annular braking face g of the annular braking portion 18 of the modified example (f) is formed of a α raw material face g' and a β raw material face g".

Figure 20:
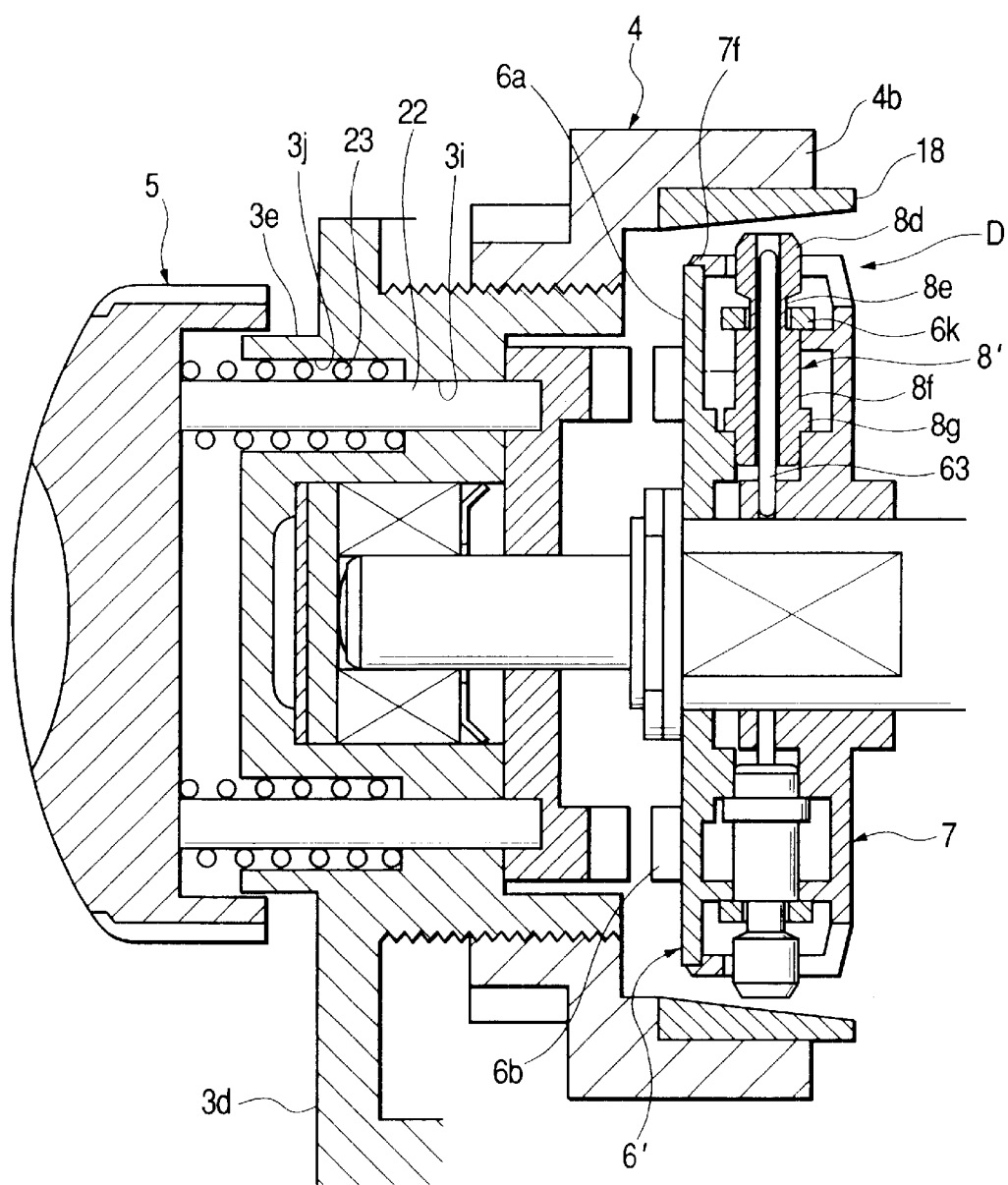
FIG. 20 is an enlarge plan view of the principal part of a double shaft receiving type reel for fishing according to a third embodiment of the invention.
Figure 21:
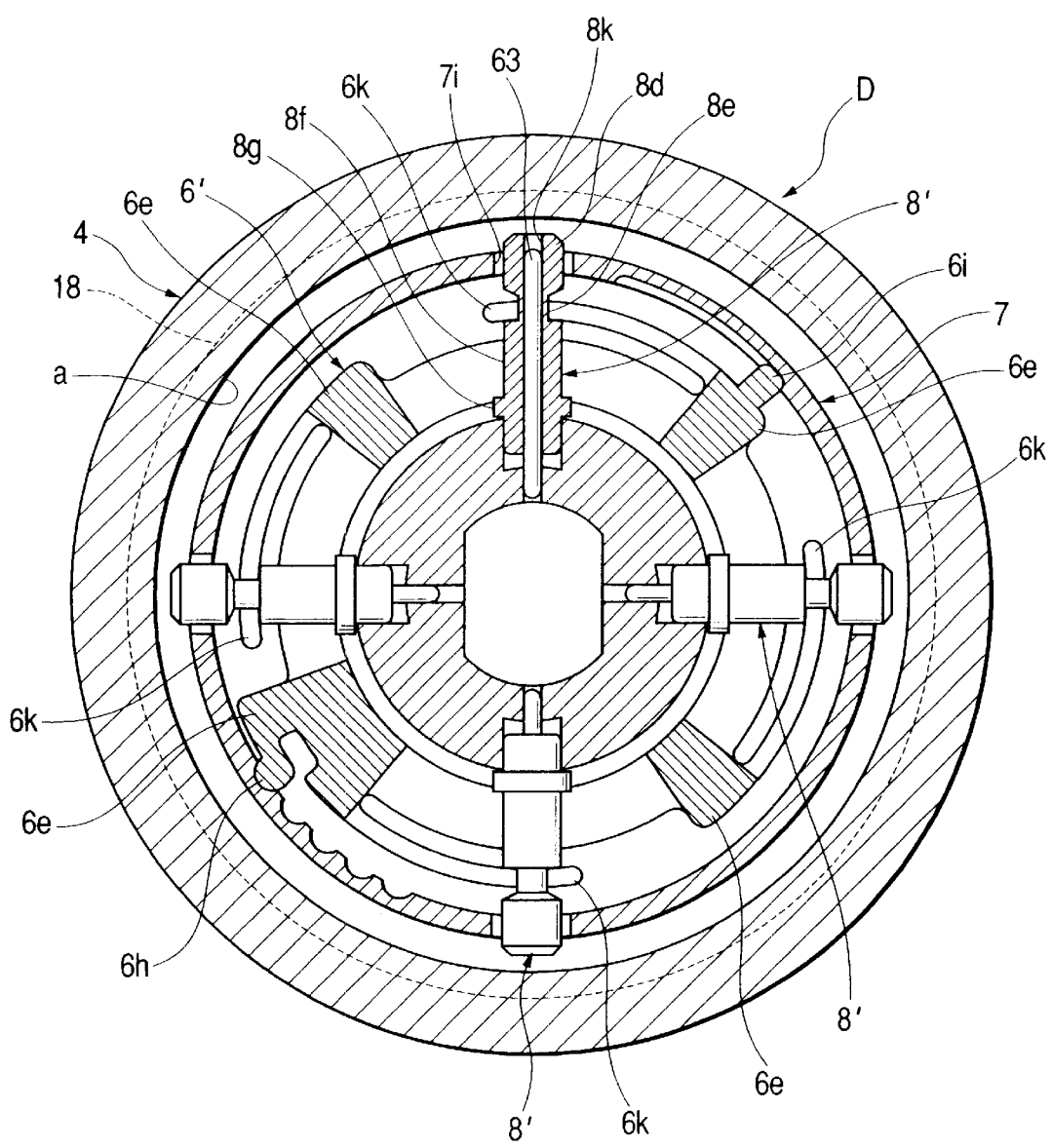
FIG. 21 is a sectional side view of the centrifugal brake unit in a weak urging condition.

FIGS. 20 and 21 show a third embodiment of the invention. FIG. 20 is an enlarge plan view of the principal part of a double shaft receiving type reel for fishing. FIG. 21 is a sectional side view of the centrifugal brake unit in a weak urging condition.

In the urging member 6' of the centrifugal brake unit D according to the third embodiment of the invention, a plurality of boss portions 6b are peripherally formed on the left face of the disk 6a with the through-hole 6d in the center.

A plurality of projected portions 6e and a cylindrical portion 6f are formed on the right face of the disk 6a.

Two fork-like parallel arm pieces 6k each extending peripherally are formed in the projected portions.

The boss-like click portion 6h having spring property is formed on one outer periphery of the projection portion 6e, whereas the boss-like pivotal angle regulating portion 6i is formed on one periphery of the other projected portion 6e.

One end of a shaft pole 63 is fixed to the support member 7.

The cylindrical portion 7f is formed on the outer periphery of the base plate 7a of the support member 7, and the disk 6a of the urging member 6' is fitted to the inner periphery of the cylindrical portion 7f.

A cylindrical braking member 8' is formed with a braking portion 8d, a neck portion 8e, a holding portion 8f, a collar portion 8g, and a through hole 8k.

The other end of the shaft pole 63 is slidably inserted into the through hole 8k.

The rest of arrangement is substantially similar to that according to the first embodiment of the invention.

Figure 22:
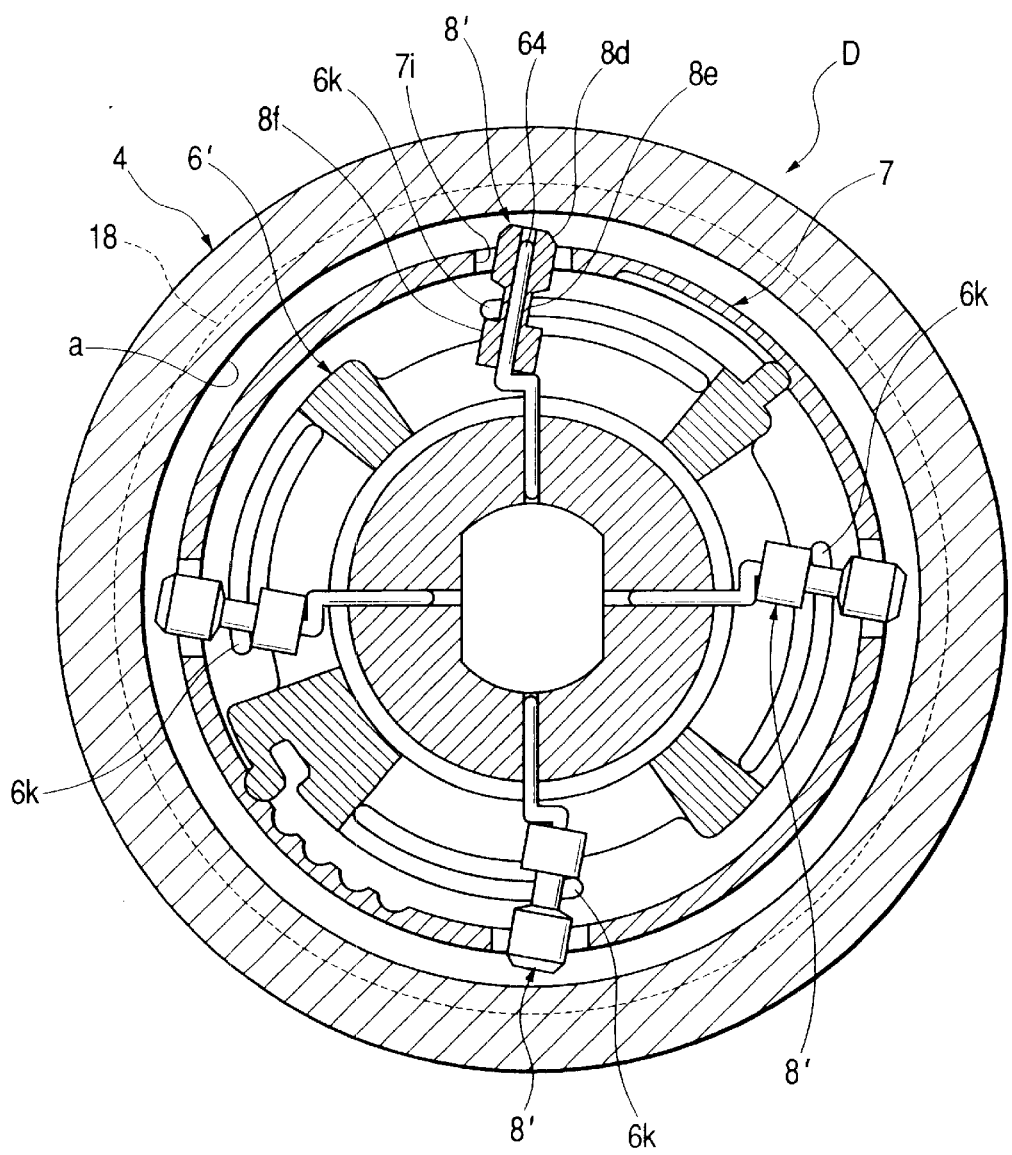
FIG. 22 is a sectional side view of a centrifugal brake unit in a weak urging condition according to a fourth embodiment of the invention.

FIG. 22 shows a fourth embodiment of the invention, wherein FIG. 22 is a sectional side view of a centrifugal brake unit in a weak urging condition.

In the centrifugal brake unit D according to the fourth embodiment of the invention, one end of a shaft pole 64 having one curved middle portion and the other tilted side is fixed to the support member 7.

The rest of arrangement is substantially similar to that according to the first and second embodiments of the invention.

Figure 23:
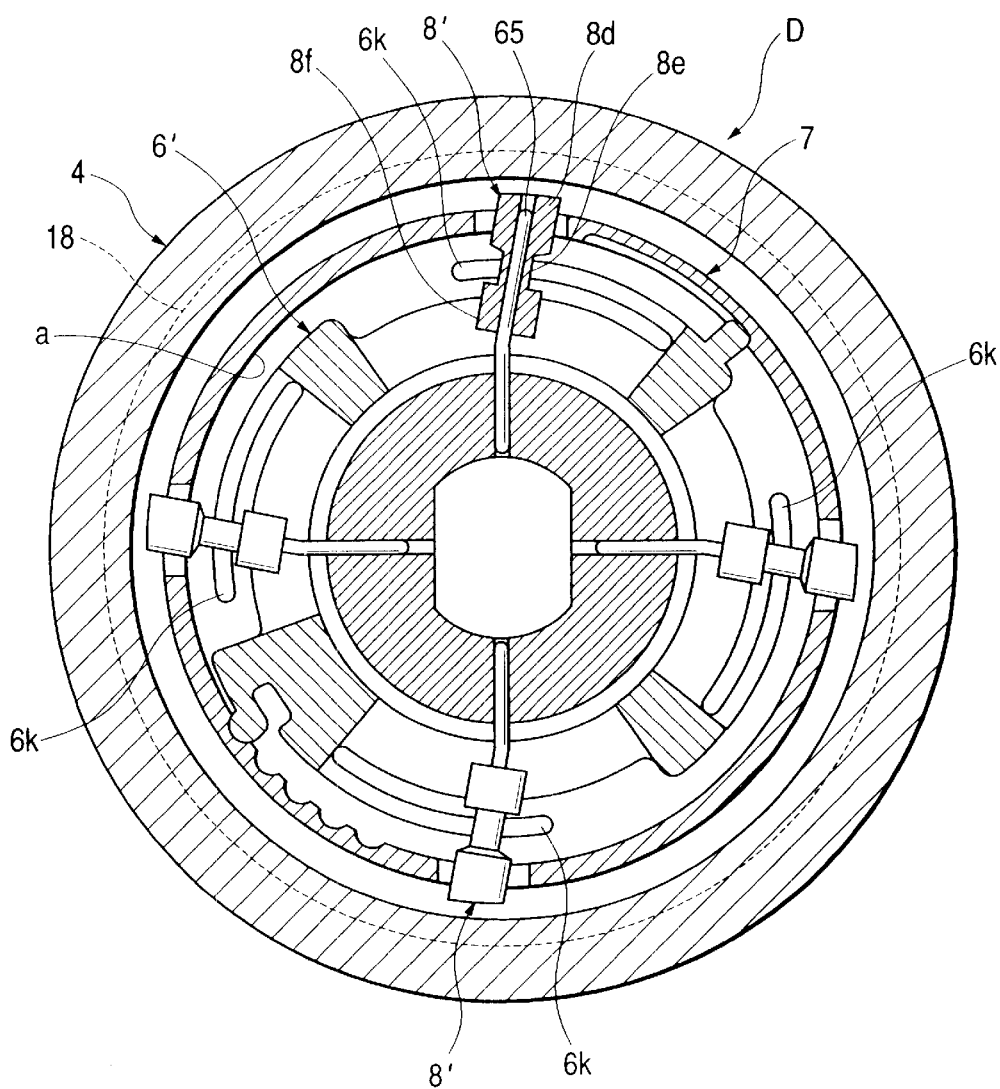
FIG. 23 is a sectional side view of a centrifugal brake unit in a weak urging condition according to a fifth embodiment of the invention.

FIG. 23 shows a fifth embodiment of the invention, wherein FIG. 23 is a sectional side view of a centrifugal brake unit in a weak urging condition.

In the centrifugal brake unit D according to the fifth embodiment of the invention, one end of a shaft pole 65 tilted from its middle portion up the other side is fixed to the support member 7.

The braking member 8' is cylindrical and formed with the braking portion 8d, the neck portion 8e and the holding portion The rest of arrangement is substantially similar to that according to the first and second embodiments of the invention.

Although the shape in side view has been described as being circular, it may be of any other shape.

Although the invention has been described in reference to the double shaft receiving type reel for fishing as an applicable fishing reel, the invention may also be applicable to a one shaft receiving type reel.

The present invention is carried out in the mode described above and the following effect is achievable.

According to the present invention, as it is unnecessary to apply braking in the low-speed rotational range of a spool, excellent spool free rotation is available so that fishing tackles may be played out toward a desired point, thus facilitating short casting. At the same time, as braking force is adjustable through operation from the outside to broadly deal with the condition of a fishing place.

According to the present invention, as braking force is adjustable internally and externally by making the urging force of a braking member operated by centrifugal force, the braking force can delicately adjusted. Further, a suitable spool braking operation corresponding to various circumstances becomes possible.

What is claimed is:

1. A fishing reel comprising:

a reel body having a side plate;

a spool rotatably supported by said reel body;

a support member integrally rotatable with said spool;

at least one braking member supported by said support member and movable in radial direction with respect to said support member;

an annular braking surface provided at said reel body, adapted to cover an outer periphery of said support member, movable with respect to said support member in an axial direction and having different frictional characteristic in said axial direction;

an urging member which urges said at least one braking member in a separating direction which said at least one braking member is separated from said annular braking surface, wherein said at least one braking member is brought into slidable contact with said annular braking face against urging force of said urging member by centrifugal force produced by a rotation of said spool; and a first regulating member provided at outside of said reel body passing through said side plate and accessible by an angler for moving said annular braking surface in said axial direction.

2. A fishing reel according to claim 1, wherein said annular braking surface has a tilted inner periphery.

3. A fishing reel according to claim 2, wherein a diameter of said tilted inner periphery becomes larger toward said support member.

4. A fishing reel according to claim 2, wherein a diameter of said tilted inner periphery becomes smaller toward said support member.

5. A fishing reel according to claim 1, wherein said annular braking surface is an arcuate face.

6. A fishing reel according to claim 1, wherein said annular braking surface is stepped face.

7. A fishing reel according to claim 1, wherein said annular braking surface is formed of at least two surfaces which have different characteristics.

8. A fishing reel according claim 7, wherein one of said at least two surfaces has a plated face and the other of said at least two surfaces has a raw material face.

9. A fishing reel according to claim 7, wherein one of said at least two surfaces has a polished face and the other of said at least two surfaces has a rough face.

10. A fishing reel according to claim 1, wherein said urging force is adjustable.

11. A fishing reel according to claim 1, wherein said urging member includes a disk portion and at least one braking member is disposed between said support member and said disk member.

12. A fishing reel according to claim 11, wherein each of said at least one arm piece is projected from said disk portion and urges each of said at least one braking member in said separating direction.

13. A fishing reel according to claim 12, wherein said urging member is rotatable with respect to said at least one braking member so that each of said at least one arm piece can slide on each of said at least one braking member.

14. A fishing reel according to claim 13, further comprising a second regulating member provided outside of said reel body and for adjusting said urging force by rotating said urging member.

15. A fishing reel according to claim 11, wherein a shaft pole fixed to said disk portion and extending in said radial direction is movably inserted into a through hole formed by longitudinally penetrating said at least one braking member.

16. A fishing reel according to claim 15, wherein one end of said shaft pole is fixed to said disk portion and the other end of said disk portion is tilted.

17. The fishing reel according to claim 16, wherein a curved middle portion is provided between said one and said other end of said disk portion.

18. A fishing reel according to claim 15, wherein said shaft pole is forked and said at least one braking member is disposed therebetween.

19. A fishing reel comprising:

a reel body;

a spool rotatably supported by said reel body;

a support member integrally rotatable with said spool;

at least one braking member supported by said support member and movable in radial direction with respect to said support member;

an annular braking surface provided at said reel body, adapted to cover an outer periphery of said support member, movable with respect to said support member in an axial direction and having different frictional characteristic in said axial direction;

an urging member which urges said at least one braking member in a separating direction which said at least one braking member is separated from said annular braking surface, wherein said at least one braking member is brought into slidable contact with said annular braking face against urging force of said urging member by centrifugal force produced by a rotation of said spool; and a first regulating member provided at outside of said reel body for moving said annular braking surface in said axial direction, wherein said urging force is adjustable.

20. A fishing reel comprising:

a reel body;

a spool rotatably supported by said reel body;

a support member integrally rotatable with said spool;

at least one braking member supported by said support member and movable in radial direction with respect to said support member;

an annular braking surface provided at said reel body, adapted to cover an outer periphery of said support member, movable with respect to said support member in an axial direction and having different frictional characteristic in said axial direction;

an urging member which urges said at least one braking member in a separating direction which said at least one braking member is separated from said annular braking surface, wherein said at least one braking member is brought into slidable contact with said annular braking face against urging force of said urging member by centrifugal force produced by a rotation of said spool; and a first regulating member provided at outside of said reel body for moving said annular braking surface in said axial direction, wherein said urging member includes a disk portion and at least one braking member is disposed between said support member and said disk member.

21. A fishing reel according to claim 20, wherein each of said at least one arm piece is projected from said disk portion and urges each of said at least one braking member in said separating direction.

22. A fishing reel according to claim 21, wherein said urging member is rotatable with respect to said at least one braking member so that each of said at least one arm piece can slide on each of said at least one braking member.

23. A fishing reel according to claim 22 further comprising a second regulating member provided at outside of said reel body and for adjusting said urging force by rotating said urging member.

24. A fishing reel according to claim 20, wherein a shaft pole fixed to said disk portion and extending in said radial direction is movably inserted into a through hole formed by longitudinally penetrating said at least one braking member.

25. A fishing reel according to claim 24, wherein one end of said shaft pole is fixed to said disk portion and the other end of said disk portion is tilted.

26. A fishing reel according to claim 25, wherein a curved middle portion is provided between said one and the other end of said disk portion.

27. A fishing reel according to claim 24, wherein said shaft pole is forked and said at least one braking member is disposed therebetween.

* * * * *